United States Patent
Tang et al.

(10) Patent No.: US 6,332,758 B1
(45) Date of Patent: Dec. 25, 2001

(54) AIR-BEARING FAN

(75) Inventors: Ping-Huey Tang, Taipei Hsien; Chi-Wei Tien, Taichung Hsien; Hsin-Pu Chen, Taichung, all of (TW)

(73) Assignee: Hsin-Mao Hsieh, Kaohsiung (TW)

( * ) Notice: Subject to any disclaimer, the term of this patent is extended or adjusted under 35 U.S.C. 154(b) by 0 days.

(21) Appl. No.: 09/512,068

(22) Filed: Feb. 24, 2000

(51) Int. Cl.⁷ .................................................. F04B 17/00
(52) U.S. Cl. ...................... 417/354; 417/365; 417/423.12
(58) Field of Search .................. 417/354, 365, 417/423.12

(56) References Cited

U.S. PATENT DOCUMENTS

| | | | |
|---|---|---|---|
| 4,783,608 | * | 11/1988 | Gruber et al. ........................ 310/90 |
| 4,820,950 | * | 4/1989 | Hijiya et al. ........................ 310/90.5 |
| 4,955,791 | * | 9/1990 | Wrobel .............................. 417/354 |
| 4,969,797 | * | 11/1990 | Takara et al. ...................... 415/113 |
| 5,028,216 | * | 7/1991 | Harmsen et al. ................... 417/354 |
| 5,818,133 | * | 10/1998 | Kershaw et al. ..................... 310/90 |

FOREIGN PATENT DOCUMENTS

| | | | | |
|---|---|---|---|---|
| 2000/81028A | * | 3/2000 | (JP) | ................................ 417/365 |
| 2000-341907A | * | 12/2000 | (JP) | ................................ 417/365 |

* cited by examiner

*Primary Examiner*—Cheryl J. Tyler
(74) *Attorney, Agent, or Firm*—Rosenberg, Klein & Lee

(57) ABSTRACT

Air-bearing fan includes a dust-proof cover, a fan blade structure, a magnet, a stator, a sleeve, an electronic circuit board, a housing and a thrust disk. While the fan blade structure is rotating, air can be induced into a ring-shaped gap so that an air-bearing is formed. And, air is also induced into a thrust gap and forms a thrust bearing. Therefore, this invention significantly reduces the noise and increases the fan's rotating speed, fan capacity and life.

4 Claims, 5 Drawing Sheets

AIR-BEARING FAN

BACKGROUND OF INVENTION

1. Field of the Invention

The present invention relates to an air-bearing fan. Particularly, it can be used in any element that needs air cooling or compulsive ventilation such as for the computer's CPU (central processing unit). This invention can achieve the advantages of lower noise, higher fan blade rotating speed, higher fan capacity and longer life.

2. Description of the Prior Art

The traditional fan can be seen in FIG. 1. It includes a fan blade structure 11, a magnet 12, a stator 13, a sleeve 14, an electronic circuit board 15, a ball-bearing 16, a thrust spring 17, a thrust washer 18 and a housing 19. The function of the ball-bearing 16 is to support the fan blade structure 11 while rotating. While the fan blade structure 11 is rotating, the central shaft (not shown) of the fan blade structure 11 and the ball-bearing 16 will create a contacting friction effect. It will make noise and limit the maximum rotation speed.

While the fan blade structure 11 is rotating at a high speed, an axial thrust force is created. Because the fan blade structure 11 directly contacts the thrust spring 17 and the thrust washer 18, it not only causes the noise, but also increases the frictional resistance. After a long period of use, the thrust spring 17 and the thrust washer 18 are possible to be worn out.

SUMMARY OF THE INVENTION

The primary object of the present invention is to provide an air-bearing fan by utilizing the air bearings to replace the traditional ball-bearing. It can reduce the contacting resistance between the shaft and the ball-bearing so as to significantly reduce the noise and increase the fan's rotating speed, fan capacity and life.

DETAILED DESCRIPTION OF THE PREFERRED EMBODIMENT

Figure 1:
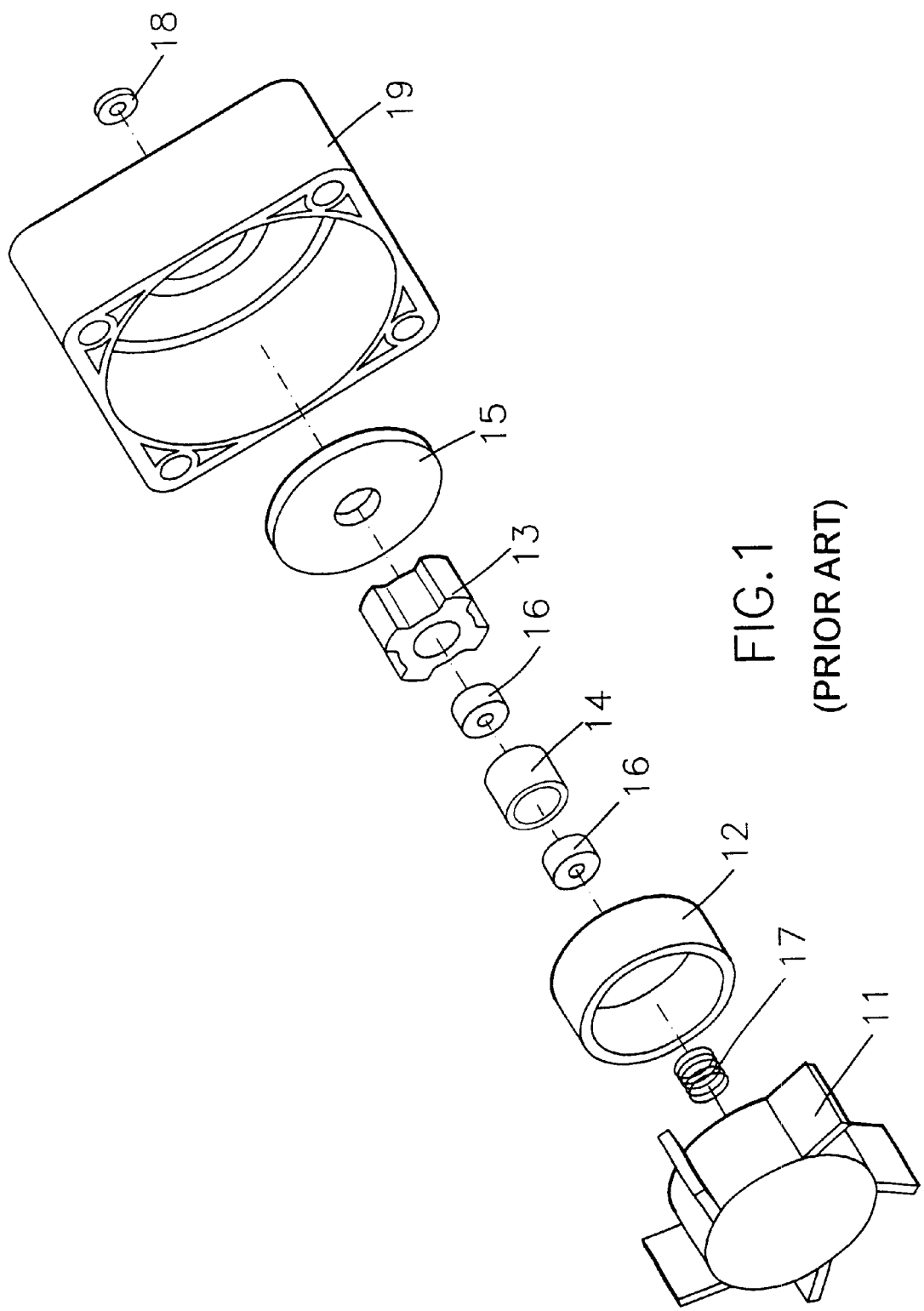
FIG. 1 is a perspective view of the disassembled prior art.
Figure 2:
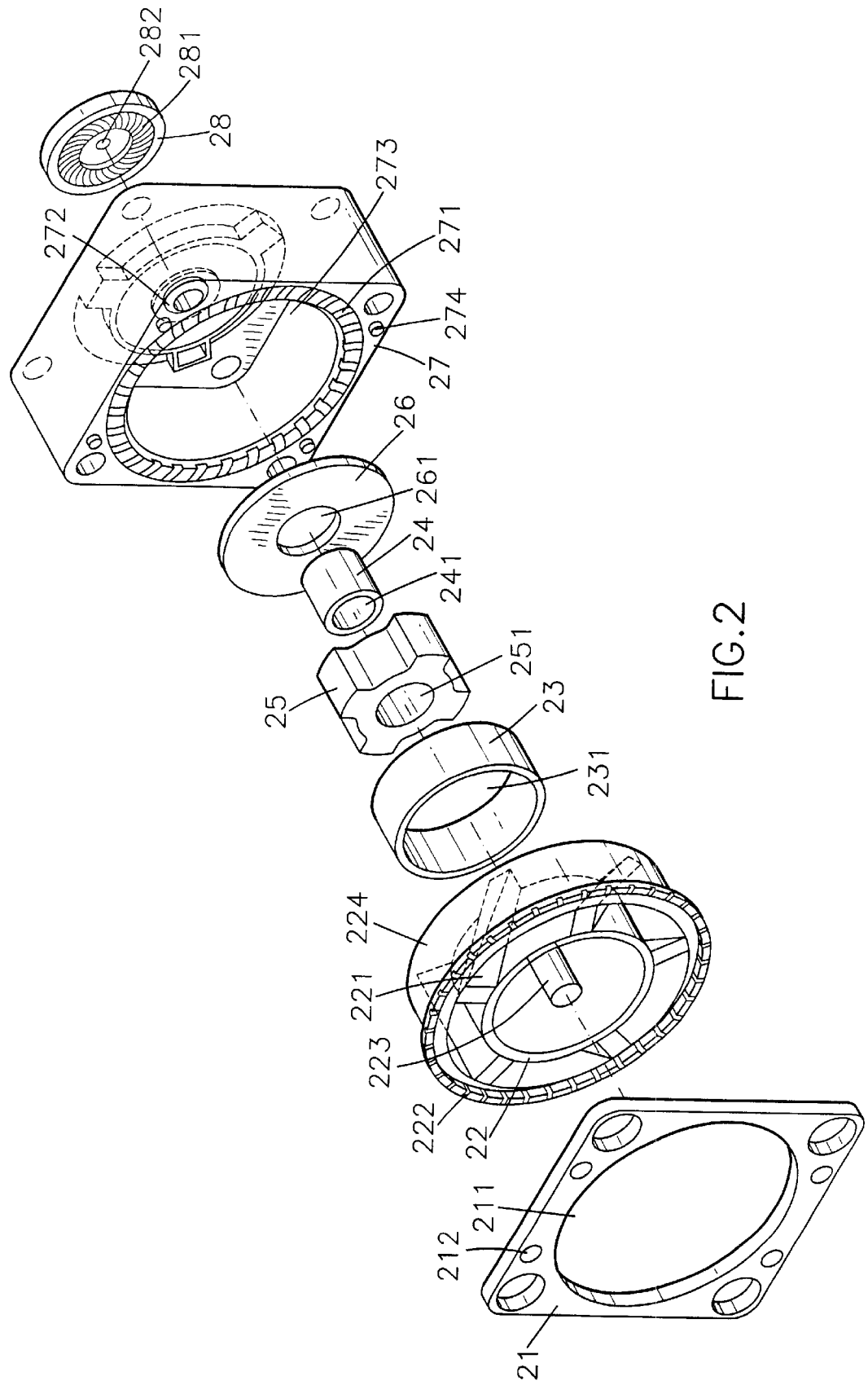
FIG. 2 is a perspective view of the disassembled present invention.
Figure 3:
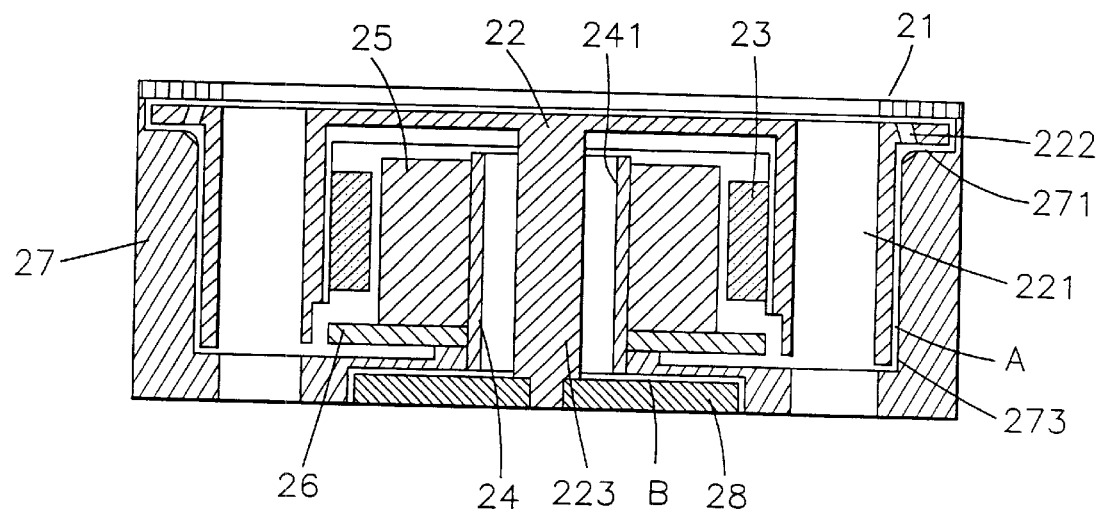
FIG. 3 is a cross-sectional view of the assembled present invention.

Referring to FIG. 2 and FIG. 3, an air-bearing fan comprises a dust-proof cover 21, a fan blade structure 22, a magnet 23, a stator 25, a sleeve 24, an electronic circuit board 26, a housing 27 and a thrust disk 28.

The dust-proof cover 21 has a central intake hole 211 and the dust-proof cover 21 is disposed on the fan blade structure 22.

The fan blade structure 22 includes a plurality of fan blades 221, an upper surface having several air-inducing inlets 222 and a central shaft 223 perpendicularly extending from a lower surface of the fan blade structure 22. A ring-shaped gap A is formed between an outer surface 224 of the fan blade structure 22 and a housing inner surface 273 of said housing 27.

The magnet 23 can be ring-shaped and is disposed on an inner side of the fan blades 221 and is fixed with the fan blade structure 22 integrally.

The stator 25 is disposed inside the magnet 23 without contacting each other. The stator 25 has a stator central hole 251.

The sleeve 24 is fitted in the stator central hole 251. The sleeve 24 has a sleeve inner surface 241. The diameter of the sleeve inner surface 241 is larger than the diameter of the central shaft 223.

The electronic circuit board 26 is fitted on and fixed with the sleeve 24. The electronic circuit board 26 has an electronic circuit board central hole 261.

The housing 27 has several housing flow-guiding slots 271 and a housing central hole 272.

The thrust disk 28 has several thrust disk flow-guiding slots 281 and a thrust disk central hole 282. The thrust disk central hole 282 is fitted in an end of the central shaft 223 so as to be fixed with the fan blade structure 22 and the magnet 23. So, when the fan blade structure 22 is rotating, a thrust gap B is formed between the thrust disk flow-guiding slots 281 and a bottom of the housing 27.

Therefore, while the fan blade structure 22 is rotating, air is induced into the ring-shaped gap A so as to form an air-bearing. And, air is also induced into the thrust gap B so as to form a thrust bearing. So, the rotating, fan, blade structure 22, magnet 23 and thrust disk 28 completely do not contact with the stationary housing 27, stator 25, sleeve 24 and electronic circuit board 26.

With regard to the assembly procedure of the present invention, they are assembled by a dust-proof cover 21, a fan blade structure 22 (including a magnet 23), a stator 25, a sleeve 24, an electronic circuit board 26, a housing 27 and a thrust disk 28. First, push the sleeve 24 into the stator central hole 251 of the stator 25. Second, push the sleeve 24 into the electronic circuit board central hole 261 of the electronic circuit board 26. Then, push in the housing central hole 272 of the housing 27. After which, make the outer surface 224 of the fan blade structure 22 and the housing inner surface 273 of the housing 27 be loosely fitted together. Then, make the thrust disk central hole 282 of the thrust disk 28 tightly fit on the central shaft 223 of the fan blade structure 22 integrally. Finally, let the engaging recesses 212 of the dust-proof cover 21 and the engaging protrusions 274 of the housing 27 be engaged together so this invention is assembled.

Figure 4A:
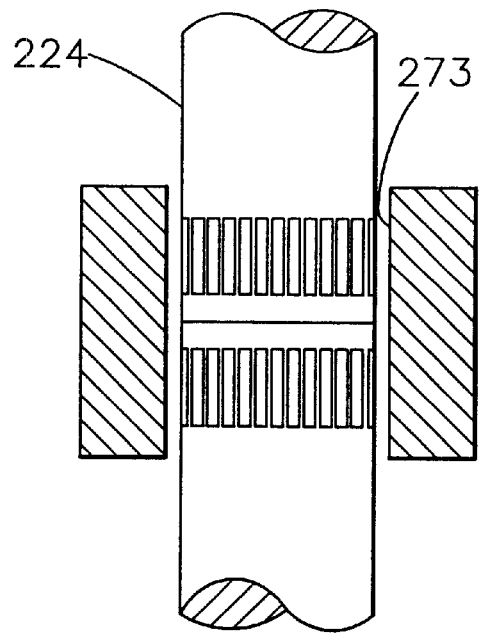
FIGS. 4A and 4B illustrate the sample patterns on the surface of outer surface of the fan blade structure and the housing inner surface.
Figure 4B:
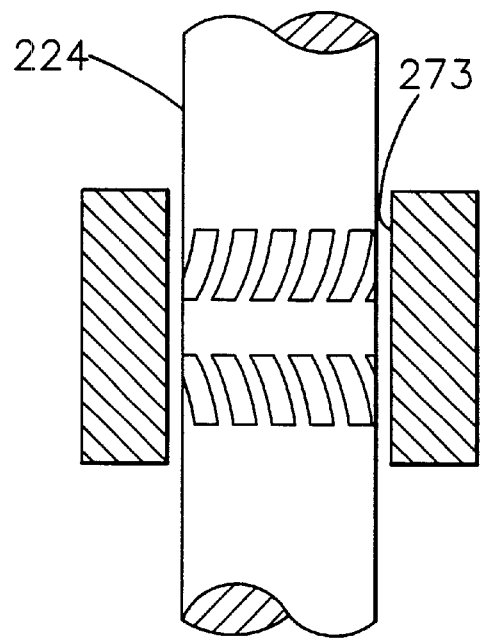
Figure 5A:
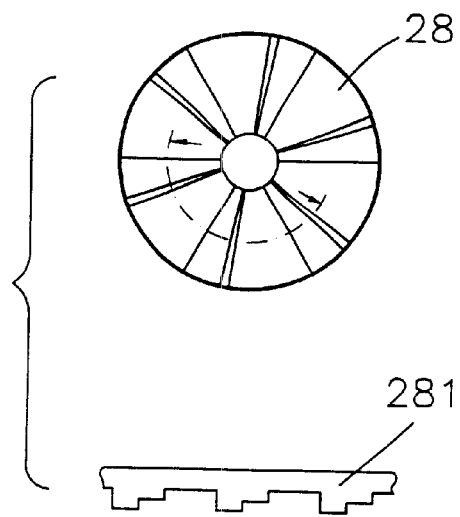
FIGS. 5A to 5D show the sample patterns on the surface of the thrust disk and the bottom of the housing.
Figure 5B:
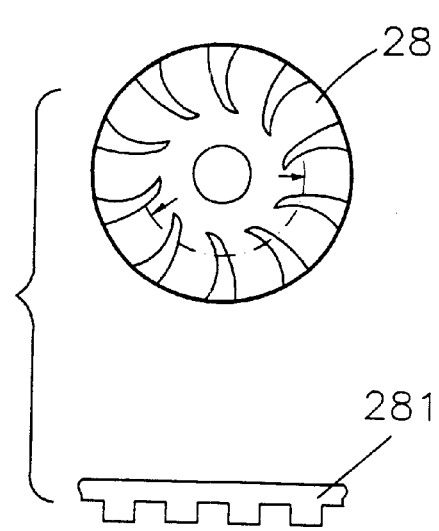
Figure 5C:
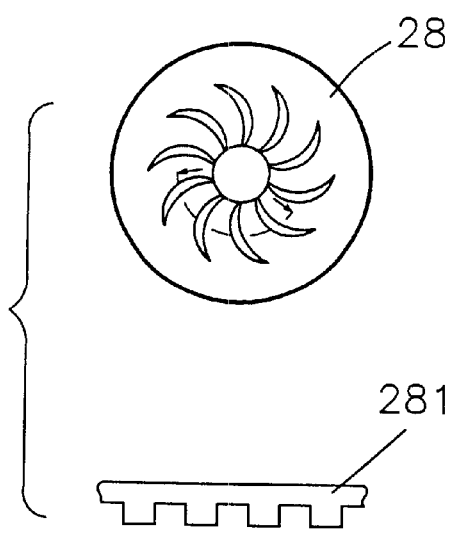
Figure 5D:
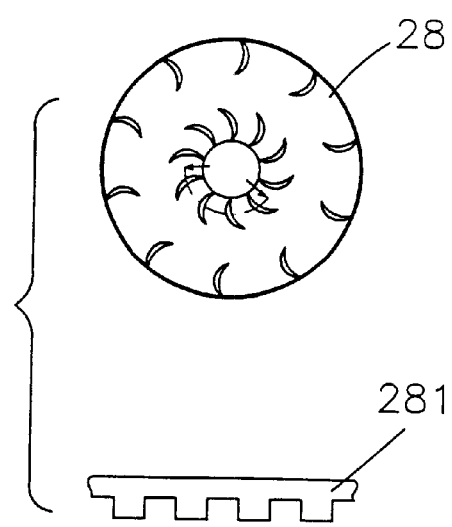

Concerning the formation of the air bearings in this invention, please refer to FIG. 3. After the air is induced in the air-inducing inlets 222 of the fan blade structure 22, the air is guided into the housing flow-guiding slots 271 and then the air is induced into the ring-shaped gap A so as to form an air-bearing. Finally, the air flows out from the bottom of the housing 27. Thus, the ring-shaped gap A becomes a high pressure air film and works as an air-bearing between the outer surface 224 of the fan blade structure 22 and the housing inner surface 273 of the housing 27. In order to increase the stability of the air-bearing, one of or both of the outer surface 224 of the fan blade structure 22 and the housing inner surface 273 of the housing 27 is or are disposed with periphery slots (shown like the one in FIG. 4A) or symmetrical slots (shown like the one in FIG. 4B).

Furthermore, the air also is induced into the space between the inner surface 224 and the central shaft 223.

Figure 6:
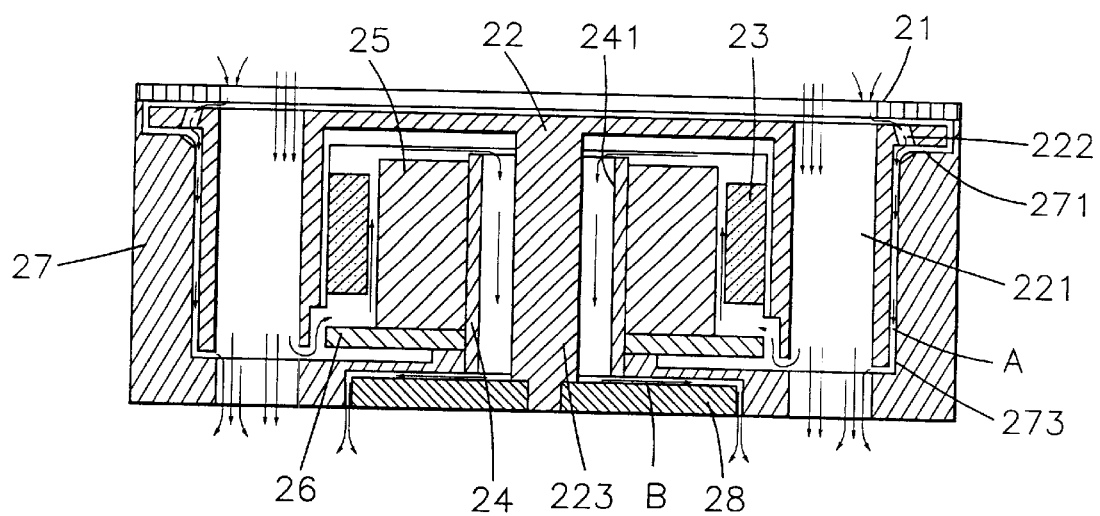
FIG. 6 shows the air flowing path inside the present invention

While the thrust disk 28 is rotating at certain high speed, the air will flow out from the thrust disk flow-guiding slots 281. At this time, an air film is formed in the thrust gap B. The air film in the thrust cap B works as thrust bearing. The air flowing path can be seen in FIG. 6. Under a high speed rotating, the air film with certain pressure will be created. This air film can afford the weight of the fan and other resistant forces. Moreover, the shape of the thrust disk flow-guiding slots 281 can be modified into different patterns like curved slots or stepped slots. Many examples are shown in FIGS. 5A to 5D.

This invention already improves the disadvantages (wearing, noise, etc.) of the traditional ball-bearing fan. This invention can be utilized in the fields of the computer's CPU (central processing unit) or other electronic elements for the cooling purpose.

What is claimed is:

1. An air-bearing fan comprising a fan blade structure, a magnet, a stator, a sleeve, an electronic circuit board, a housing and a thrust disk; wherein said fan blade structure including a plurality of fan blades, an upper surface having several air-inducing inlets and a central shaft perpendicularly extending from a lower surface of said fan blade structure, a ring-shaped gap being formed between an outer surface of said fan blade structure and a housing inner surface of said housing;

said magnet being disposed on an inner side of the fan blades and being fixed with said fan blade structure;

said stator being disposed inside said magnet without contacting each other, said stator having a stator central hole;

said sleeve being fitted in the stator central hole, said sleeve having a sleeve inner surface, the diameter of said sleeve inner surface being larger than the diameter of said central shaft;

said electronic circuit board being fitted on and fixed with said sleeve, said electronic circuit board having an electronic circuit board central hole;

said housing having several housing flow-guiding slots and a housing central hole; and said thrust disk having several thrust disk flow-guiding slots and a thrust disk central hole, said thrust central hole being fitted in an end of the central shaft so as to be fixed with said fan blade structure and said magnet, a thrust gap being formed between said thrust disk flow-guiding slots and a bottom of said housing when the fan structure is rotating.

2. The air-bearing fan as claimed in claim 1, wherein at least one of the outer surface of said fan blade structure and the housing inner surface of said housing being disposed with slots having an arrangement selected from the group consisting of symmetrical slots and spiral slots.

3. The air-bearing fan as claimed in claim 1, wherein said thrust disk flow-guiding slots are disposed with a contour selected from the group consisting of curved and stepped.

4. The air-bearing fan as claimed in claim 1, further comprising a dust-proof cover being disposed on said fan blade structure.

* * * * *